Figure 1:
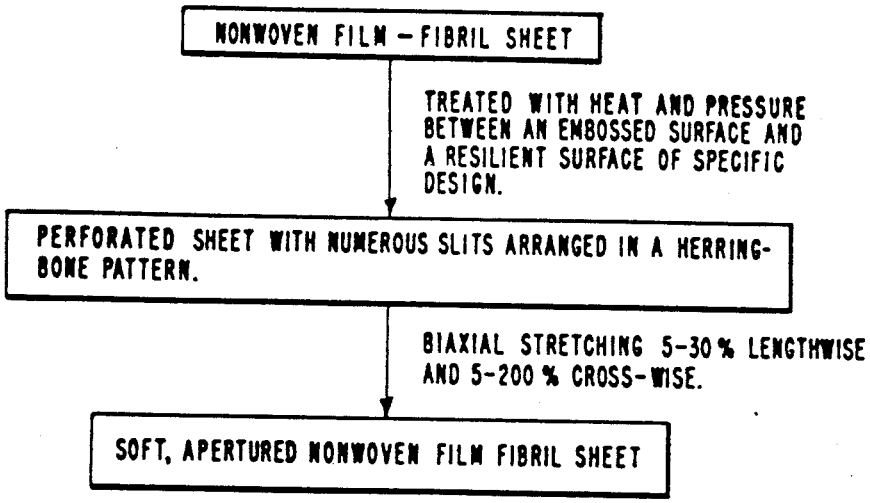
Figure 2:
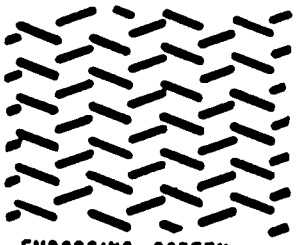
Figure 3:
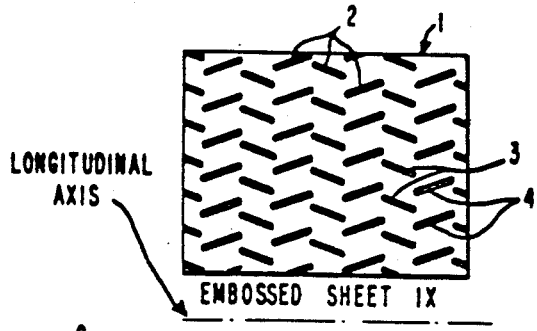
Figure 4:
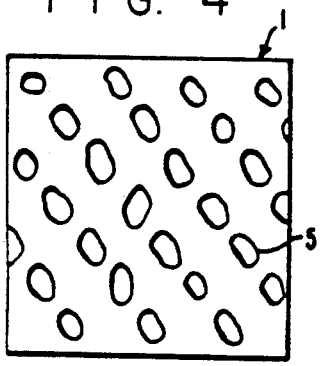
Figure 5:
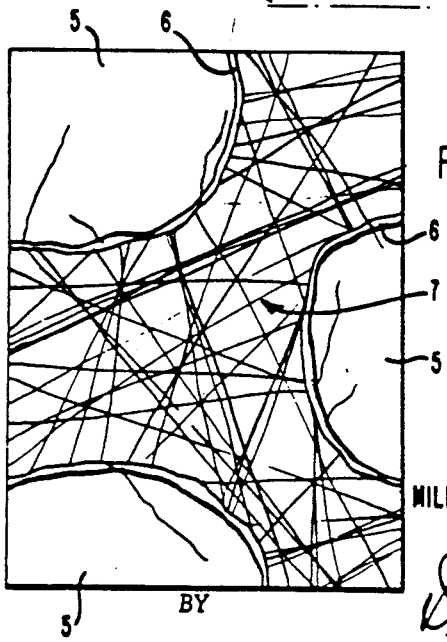

T857,038

BEST AVAILABLE COPY

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 24, 1968

857 O.G. 1037

544,271

APERTURED NON-WOVEN STRUCTURE FROM A FILM-FIBRIL SHEET AND METHOD OF MAKING THE SAME

Millard David Zeisberg, Newark, Del., assignor to E. I. du Pont de Nemours and Company, Wilmington, Del., a corporation of Delaware

Filed Apr. 21, 1966. Published Dec. 24, 1968
Class 161—109
1 Sheet Drawing. 14 Pages Specification

F I G. 1

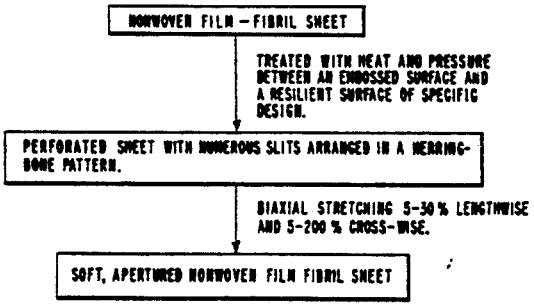

This invention relates to a process for making a soft, apertured, fibrous, nonwoven structure having a high strength per unit weight from a film-fibril sheet. The basic film-fibril sheet is prepared from flash-spun continuous fibrillated strands, preferably of linear high density polyethylene, according to the method of Steuber U.S. Patent 3,169,899. The process of the present invention comprises hot-slit perforating the nonwoven film-fibril sheet by pressing between a supported hot wire screen and a resilient surface. Sufficient heat is supplied and sufficient pressure is exerted between the two surfaces to provide an embossed sheet having numerous perforations in the form of slits. The slits are arranged in two series as in a herringbone pattern with at least one slit per square centimeter in the useable area of the sheet, the slits being at least 0.2 cm. long. The sheet is fused around the edges of the slits, but is unfused elsewhere. The slit sheet is then stretched 5–30% in a direction which is within 5–45° of the orientation of one of the two series of slits, this direction being usually along the longitudinal axis of the sheet. Optionally, the product is then stretched 5–200% in a second direction at about 90° to the first streteh direction.

BEST AVAILABLE COPY

T857038
944271

EMBOSSING SCREEN SURFACE, IX

EMBOSSED SHEET IX

EMBOSSED STRETCHED SHEET

INVENTOR
MILLARD DAVID ZEISBERG

BY

ATTORNEY